Aug. 29, 1950  R. E. SCHWARTZ  2,520,442
COMBINED SHOCK AND VIBRATION MOUNT
Filed Aug. 24, 1948

INVENTOR
RALPH E. SCHWARTZ
BY
Mason & Graham
ATTORNEYS

Patented Aug. 29, 1950

2,520,442

UNITED STATES PATENT OFFICE 2,520,442

COMBINED SHOCK AND VIBRATION MOUNT

Ralph E. Schwartz, Pasadena, Calif., assignor, by mesne assignments, to E. L. Green, Los Angeles, Calif.

Application August 24, 1948, Serial No. 45,947

6 Claims. (Cl. 248—358)

This invention has to do generally with shock and vibration absorbing mounting devices and particularly with devices of this nature which are designed for use in mounting delicate instruments and equipment such as electronic equipment.

An object of this invention is to provide a novel mounting device for use in supporting delicate equipment and substantially isolating the same from vibration and shock.

Another object is to provide a mounting design to control shock and vibration impulses separately. In this connection, it is an object to provide a mounting in which the load is carried by a spring which serves to substantially control vibration and in which a dampening means is provided for dissipating the energy of sudden acceleration or shock. This results in a mounting which may be described as having a load carrying suspension with little inherent dampening and a dampener with a maximum amount of inherent dampening.

Another object is to provide a device of the type indicated in which there is never any sharp metal-to-metal contact of the parts.

A further object is to provide a mounting in which the suspension is self-grounded preventing the storing of static electricity.

Still another object is to provide a mounting in which vertical and horizontal rates are controlled so closely that vertical components do not result from horizontal acceleration.

Another object is to provide a device of the type indicated which will operate under a wide range of temperature conditions.

These and other objects will be apparent from the drawing and the following description thereof. Referring to the drawing, which is for illustrative purposes only:

Figure 1:
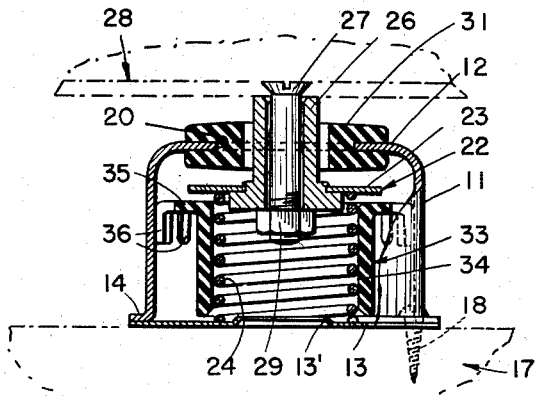
Fig. 1 is a sectional view of a mounting device embodying the invention.
Figure 2:
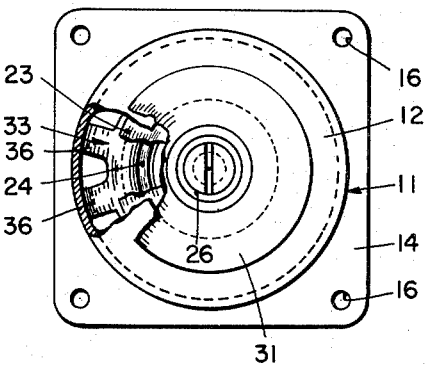
Fig. 2 is a plan view of the device of Fig. 1 partially broken away to show the interior.

More particularly describing the invention, reference numeral 11 generally indicates a casing which has a pair of spaced end walls 12 and 13. The wall 13 is in the form of a plate to which the remainder of the casing is attached in any suitable manner as by means of spot welding, the remainder of the casing being of general cup-like form provided with a mounting flange 14. The plate or end wall 13 is shown as substantially square and provided with four holes 16 by means of which the device may be secured to a supporting element such as that shown in broken lines in Fig. 1 and indicated by numeral 17. Screws 18 may be used for effecting the attachment. The end wall 12 of the casing is provided with a centrally disposed aperture 20, the purpose of which will later become apparent.

A load carrying member 22 is provided within the casing. This member includes a circular plate portion 23 which is supported on a coil spring 24, the spring being interposed between the end wall or plate 13 of the casing and the member 23. The load carrying member is also provided with a centrally disposed tubular stud 26 which receives a fastening screw 27 for the purpose of attaching the load such as equipment 28 shown in broken lines in Fig. 1. The screw may be held in place by means of a nut 29 on the inner end thereof. In this connection, the end wall or plate 13 may be provided with a circular opening 13' to provide access to the plate and permit the attachment of nut 29.

The stud 26 extends freely through the aperture 20 in the casing. The portion of the casing defining the aperture is provided with a resilient rubber-like guard ring 31 which may be formed of a suitable thermoplastic material. The dimensions of this ring and the stud 26 are such as to permit considerable movement of the stud laterally before it contacts the ring.

It will be apparent from the above description that the load is supported on the spring 24 which should be proportioned in size and strength for the particular load which it is to bear so that the spring will have an identical rate in all modes of vibration when the device is installed. In the drawing the spring is shown loaded. The spring also controls the normal vibrations which are expected in a given installation.

Figure 3:
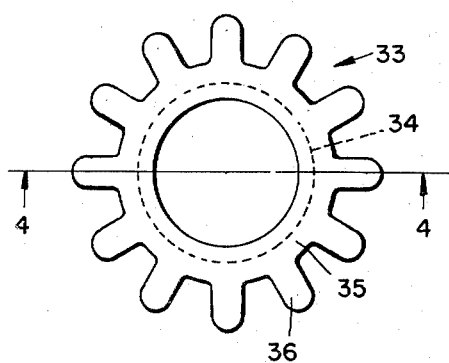
Fig. 3 is a plan view of the dampener element.
Figure 4:
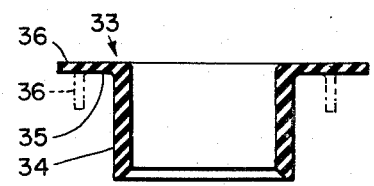
Fig. 4 is a sectional view of the dampener element.

In order to provide means for dampening sudden shocks which would otherwise be transmitted from the supporting member 17 to the equipment 28, the live coils of the spring are surrounded by a dampener member 33 of a rubber-like material which may be a suitable resilient thermo-plastic. This member has a tubular body portion 34 which surrounds and contacts the live coils of the spring and an external flange 35 at one end which terminates in a plurality of radially extending projections 36. The projections 36 extend radially in a common plane when the device is in normal position such as shown in Figs. 3 and 4. However, the length of the projections is such that when the dampener member is inserted in the casing 11 the projections are deflected downwardly or away from the load carrying element 22, as shown in Fig. 1, where they lie in contact with the inner wall of the casing.

The dampener serves to provide some dampening effect to the coils of the spring at all times and by reason of its contact with the inner wall of the casing, serves to dampen any sudden lateral shock impulses. If the shock impulse is severe, causing major lateral deflection of the casing 11, the stud 26 will impinge against the guard ring 31 but in no event will there be any sharp metal-to-metal contact.

Where the device is subjected to relatively severe shock the energy is absorbed or decelerated in three stages. Initially the spring yields, resisting the force through its own resiliency, secondly, the dampener yields resisting the force through its resiliency and its contact with the casing, and finally the bumper or guard ring provides the ultimate stop.

It is contemplated however, that only rarely will the device be subjected to a severe enough shock to cause contact of the load or load carrying parts with the bumper ring since in normal installations the size, strength and degree of resiliency of the parts will be proportioned to the load the device must bear and to the anticipated vibrations and shocks.

Figure 5:
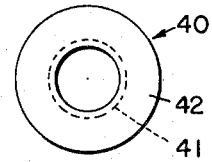
Fig. 5 is an elevational view of another form of dampener element.
Figure 6:
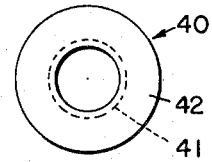
Fig. 6 is a plan view of the element of Fig. 5.

It will be apparent from the above description that not only may the design of the spring be changed to meet different loadings, but also the resiliency or the mass of the dampener may be varied in individual mountings so that it will provide successful dampening of anticipated shock energy. The number, shape and size of the projections 36 on the dampener may also be varied to increase or decrease the stiffness of the dampener. In this connection, in Figs. 5 and 6 there is shown a modified form of dampener member 40 which includes a tubular body 41 similar to the body of the dampener element previously described. This body however, is provided with a solid or continuous annular flange 42 in place of the interrupted flange of the dampener previously described. This member is relatively stiffer than the other device. The broken lines in Fig. 5 indicate the position of the flange when in the casing of the mounting.

Although the invention has been particularly shown and described, it is contemplated that various changes and modifications can be made without departing from the scope thereof as set forth in the claims.

I claim:

1. A mounting comprising a casing having spaced end walls, one of said walls being apertured, a load supporting plate in said casing adjacent the apertured end wall, a coil spring between the other end wall of the casing and said load supporting plate, and dampening means formed of a resilient non-metallic material surrounding and contacting the live coils of said spring and having limited contact with said casing.

2. A mounting comprising a circular casing having a centrally apertured end wall and a base end wall, a load supporting plate in said casing, a coil spring between said base end wall and said load supporting plate, and a dampener member of thermo-plastic material, said member having a tubular body surrounding and contacting the live coils of said spring and an external flange contacting the inner wall of said casing.

3. A mounting comprising a circular casing having a centrally apertured end wall and a base end wall, a load supporting plate in said casing, a coil spring between said base end wall and said load supporting plate, and a dampener member of thermo-plastic material, said member having a tubular body surrounding and contacting the live coils of said spring and a plurality of radially extending projections arranged in a common plane and contacting the inner wall of said casing.

4. A mounting comprising a circular casing having an apertured end wall and a base end wall spaced therefrom, a load supporting plate in said casing, a mounting stud on said plate freely projecting through the aperture in said end wall, a coil spring between said base end wall and said load supporting plate, a dampener member of thermo-plastic material, said member having a tubular body surrounding and contacting the live coils of said spring and a plurality of radially extending projections arranged substantially in a common plane and contacting the inner wall of said casing, said projections being at the end of said dampener member adjacent to said load supporting plate, and a resilient bumper member guarding the edge portion of the end wall defining the aperture.

5. A mounting comprising a circular casing having an apertured end wall and a base end wall spaced therefrom, a load supporting plate in said casing, a mounting stud on said plate freely projecting through the aperture in said end wall, a coil spring between said base end wall and said load supporting plate, a dampener member of thermo-plastic material, said member having a tubular body surrounding and contacting the live coils of said spring and a flanged portion contacting the inner wall of said casing, said flanged portion being at the end of said dampener member adjacent to said load supporting plate, and a resilient bumper member guarding the edge portion of the end wall defining the aperture.

6. A mounting comprising a casing having spaced end walls, one of said end walls being apertured, a mounting stud extending freely through the apertured end wall, a coil spring between the stud and the other end wall of the casing, and dampening means formed of a resilient non-metallic material surrounding and contacting the live coils of said spring and having contact with said casing.

RALPH E. SCHWARTZ.

REFERENCES CITED

The following references are of record in the file of this patent:

UNITED STATES PATENTS

| Number | Name | Date |
| --- | --- | --- |
| 2,425,565 | Robinson | Aug. 12, 1947 |